US009700159B2

(12) United States Patent
Calderon et al.

(10) Patent No.: US 9,700,159 B2
(45) Date of Patent: Jul. 11, 2017

(54) NON-LINEAR CHECKOUT STAND

(75) Inventors: Ferdinand Calderon, Cebu (PH); Jason Delos Angeles, Cebu (PH)

(73) Assignee: NCR CORPORATION, Duluth, GA (US)

( * ) Notice: Subject to any disclaimer, the term of this patent is extended or adjusted under 35 U.S.C. 154(b) by 310 days.

(21) Appl. No.: 13/562,737

(22) Filed: Jul. 31, 2012

(65) Prior Publication Data

US 2014/0040057 A1 Feb. 6, 2014

(51) Int. Cl.

*G06Q 20/00* (2012.01)
*A47F 9/04* (2006.01)
*G06Q 30/00* (2012.01)
*G01S 19/42* (2010.01)

(52) U.S. Cl.

CPC ............. *A47F 9/048* (2013.01); *G06Q 30/00* (2013.01)

(58) Field of Classification Search

USPC .................................................... 705/23; 3/23
See application file for complete search history.

(56) References Cited

U.S. PATENT DOCUMENTS

| | | | | |
|---|---|---|---|---|
| 4,593,194 A * | 6/1986 | Graham et al. | .......... | 250/231.16 |
| 6,329,139 B1 * | 12/2001 | Nova | .................. | B01J 19/0046 209/597 |
| 8,054,218 B2 * | 11/2011 | Gelbman | .............. | G06F 3/1454 342/357.25 |
| 8,069,971 B2 * | 12/2011 | Swinderman | .......... | B65G 45/16 198/499 |
| 2013/0346302 A1 * | 12/2013 | Purves | ................. | G06Q 20/102 705/40 |

* cited by examiner

*Primary Examiner* — Garcia Ade
(74) *Attorney, Agent, or Firm* — Paul W. Martin; Schwegman, Lundberg & Woessner

(57) ABSTRACT

A non-linear checkout stand which offers retailers additional options for configuring a store. An example checkout stand includes a housing including a first end and a second end, a conveyor for transporting items in a plurality of different directions along a non-linear path connecting the first end to the second end, and an item identifier within the housing on the non-linear path for automatically identifying the items.

19 Claims, 3 Drawing Sheets

NON-LINEAR CHECKOUT STAND

BACKGROUND

The present invention relates to checkout systems and methods and more specifically to a non-linear checkout stand.

Retailers wish to reduce transaction time and expedite the customer checkout process. Conventional checkout stands, whether used for self-service or assisted service operation, are generally rectangular in shape and move items along a linear path. These checkout stands may include a linear conveyor belt for moving items from a receiving end to an operator station. The operator station may include a transaction terminal including a barcode reader for identifying the items somewhere in the middle of the checkout stand. The transaction terminal enters the items into a purchase transaction. In alternative configurations, items may pass through a tunnel in which the barcode reader is located. A takeaway belt along the linear path moves the items from the operator station to a bagging end. A plurality of these checkout stands may be arranged in parallel, with linear customer paths or checkout lanes in between.

The footprint of these conventional checkout stands may be undesirably long for some installations. Also, these checkout stands transport items to a bagging end which is far enough away from a customer to be out of view of the customer and otherwise unguarded.

Therefore, it would be desirable to provide an alternative checkout stand design, one in which items move along a non-linear path from one end to another end.

SUMMARY

In accordance with the teachings of the present invention, a non-linear checkout stand is provided.

An example checkout stand includes a housing including a first end and a second end, a conveyor for transporting items in a plurality of different directions along a non-linear path connecting the first end to the second end, and an item identifier within the housing on the non-linear path for automatically identifying the items.

An example computerized method of operating a checkout stand to process items during a transaction includes operating a conveyor to transport items in a plurality of different directions along a non-linear path from a first end of a checkout stand housing where the items are placed by a customer to a second end of the checkout stand housing where the items are removed by the customer, and receiving identification information associated with the items from an item identifier in the housing on the non-linear path.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
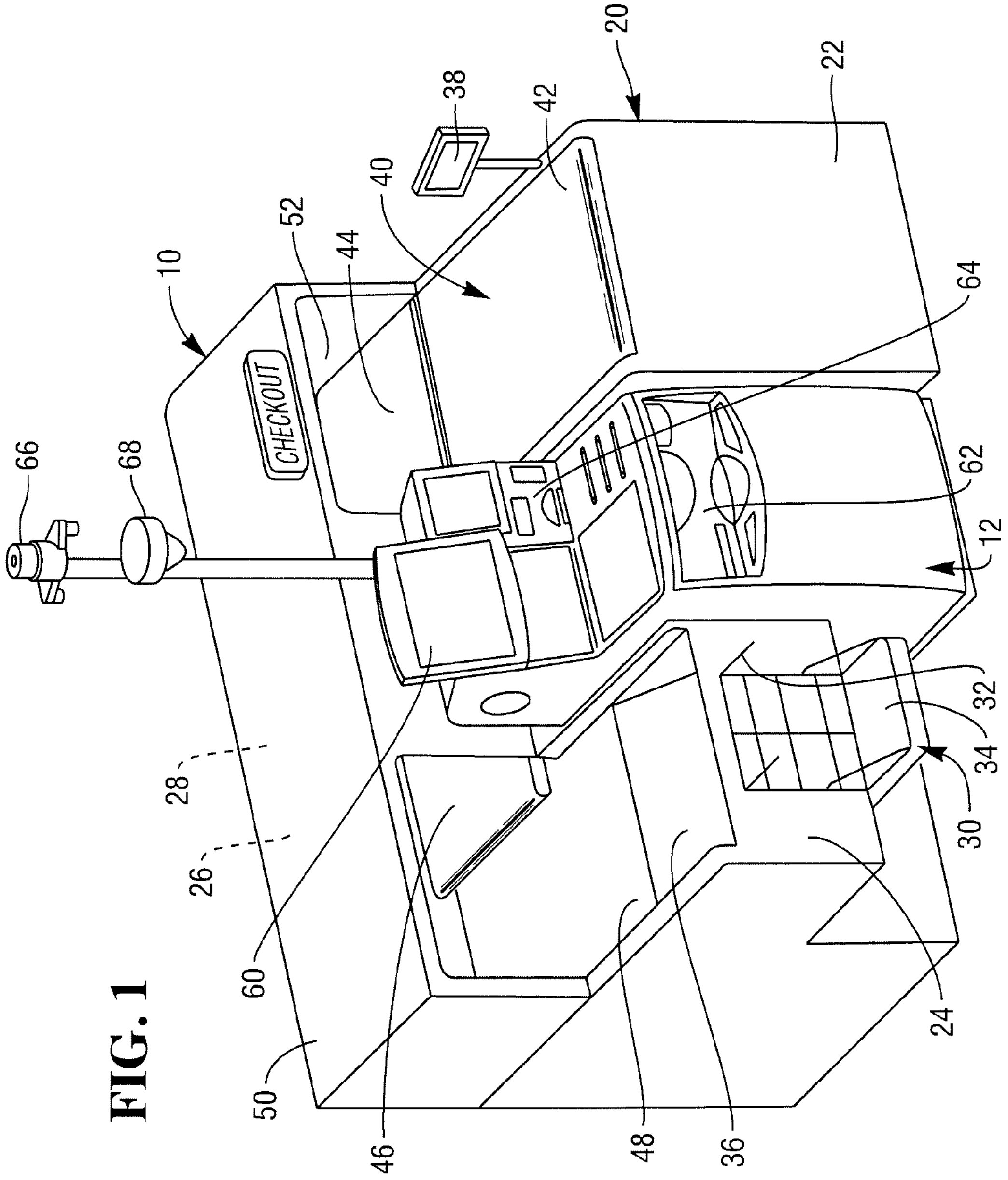
FIG. 1 is a perspective view of an example checkout stand.
Figure 2:
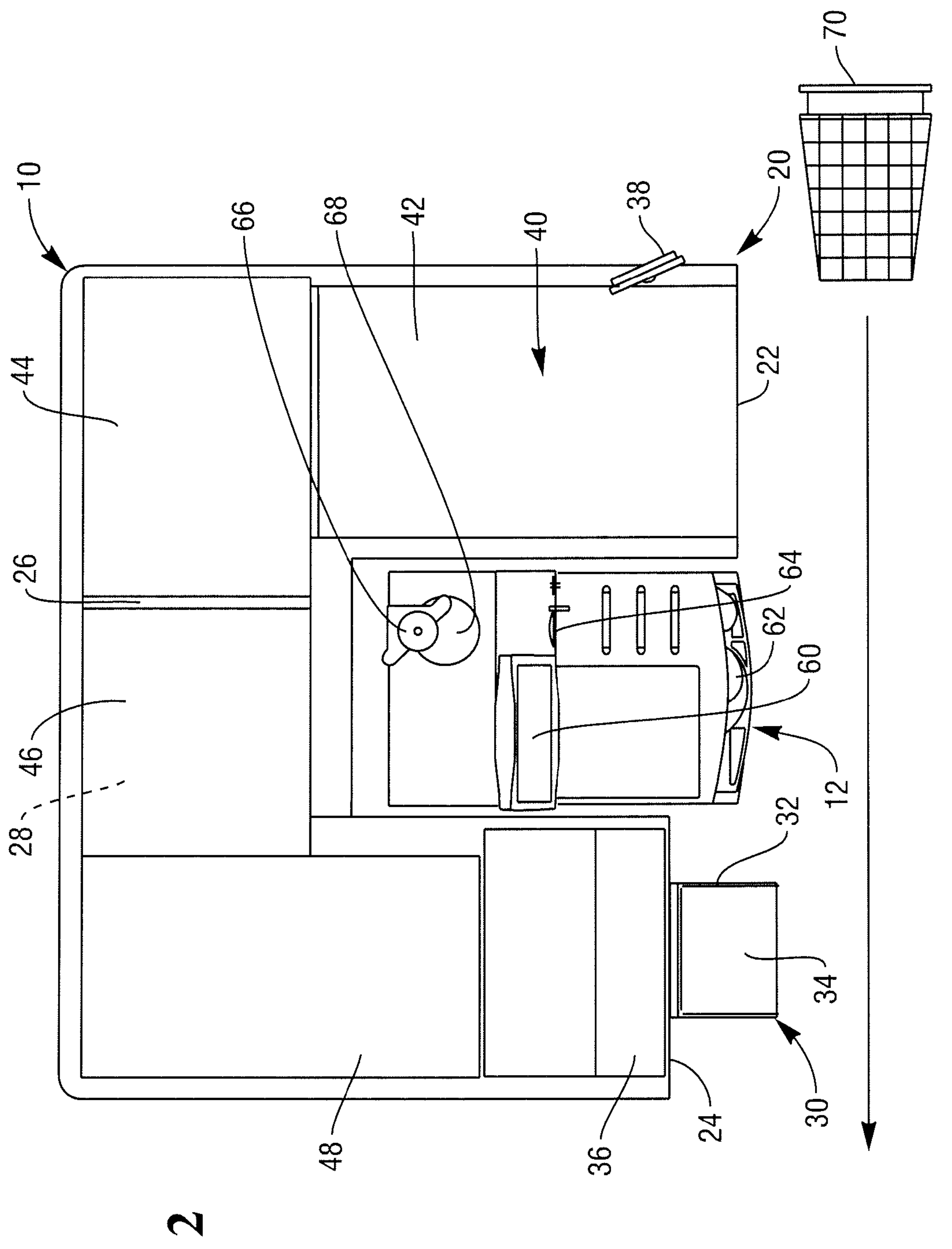
FIG. 2 is a top view of the example checkout stand with a tunnel structure removed.

With reference to FIGS. 1-2, an example embodiment of a checkout stand 10 is illustrated. Checkout stand 10 includes a generally U-shaped housing 20 having adjacent input and output ends 22 and 24. Transaction terminal 12 is located between ends 22 and 24. Checkout stand 10 may be suited for use by a customer as a self-service checkout station or by an attendant as an assisted service checkout station.

Housing 20 includes conveyor 40 and tunnel cover 50. Conveyor 40 transports items from input end 22 to output end 24 along a generally U-shaped path. Conveyer 40 may include one or more sections. For example, conveyor 40 may include four straight sections 42, 44, 46, and 48. Corners of housing 20 are generally square to accommodate straight conveyor belts. Conveyor section 42 transports items to conveyor section 44, which transports the items to conveyor section 46 which transports the items to conveyor section 48. In one example embodiment, conveyor sections 42-48 include belts and one or motors for moving the belts.

Figure 3:
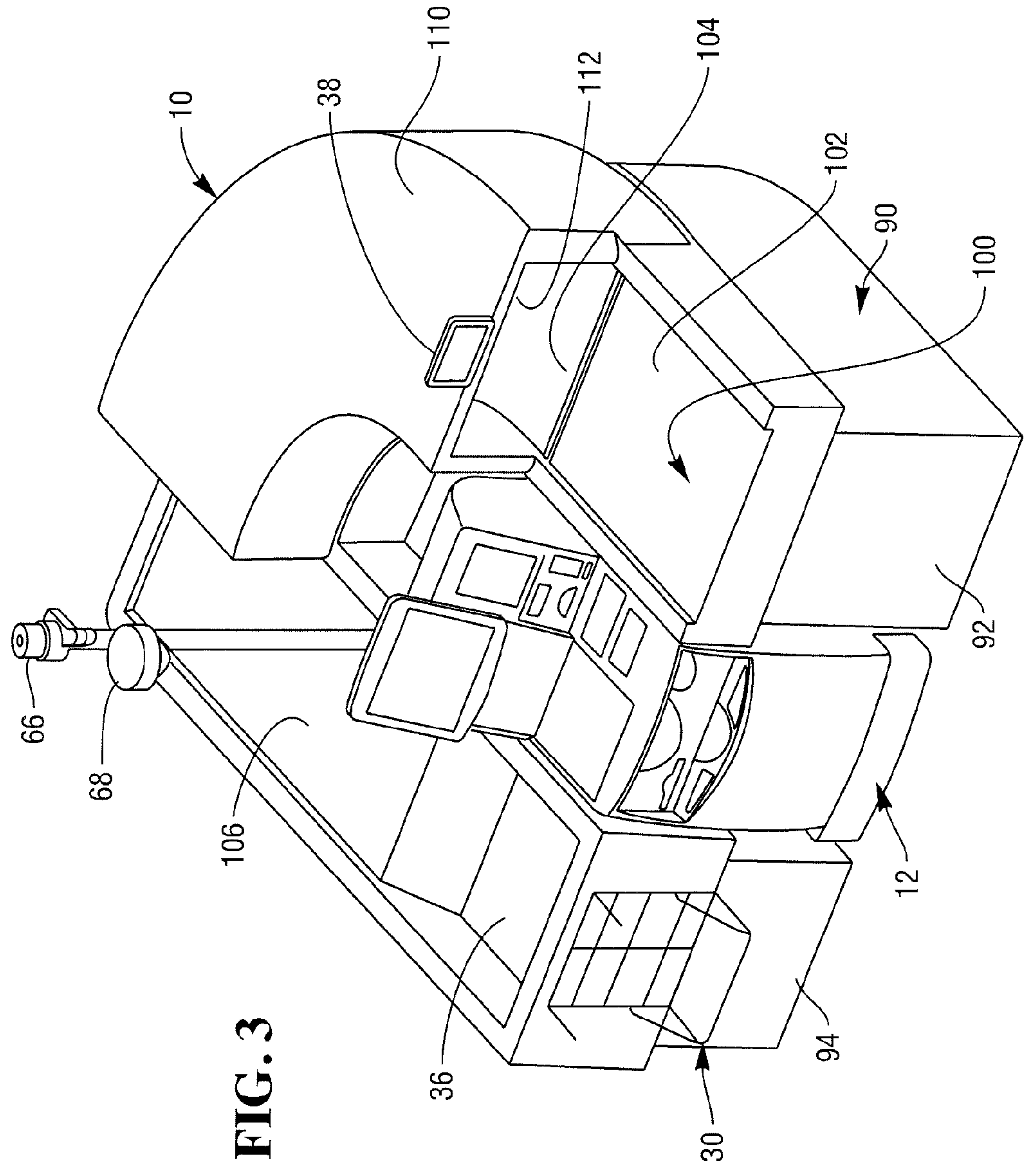
FIG. 3 is a perspective view of another example checkout stand.

Tunnel cover 50 covers a portion of the U-shaped path and conveyor 40 and defines a tunnel 52. The entry and exit apertures of the tunnel may vary in location. In one example, the entry and exit apertures of the tunnel may face the input and output ends 22 and 24, respectively (FIG. 1). In another example embodiment, the entry and exit apertures may face in different directions, the entry aperture facing the input end 22 and the exit aperture facing perpendicular to output end 24 (FIG. 3).

Housing 20 includes one or more item identifiers 26 within tunnel 52. Item identifier 26 is coupled to transaction terminal 12. For example, item identifier 26 may include a barcode reader for reading barcodes on items. As another example, item identifier 26 may include a radio frequency identification (RFID) label reader for reading RFID labels on the items. Another example item identifier 26 may include a camera for capturing images of items, such as produce items.

Housing 20 further includes one or more scales 28 below conveyor 40 and within tunnel 52 for weighing items. Scale 28 weighs produce items and is coupled to transaction terminal 12. Transaction terminal 12 uses the weight information to determine the price of the produce items. Transaction terminal 12 may also use scale 28 to weigh other items in order to verify item identification information from item identifier 26.

Housing 20 may include a bagging station 30 at output end 24 including a bag rack 32 and bag shelf 34 for supporting bags of items. Conveyor 40 causes items to accumulate at output end 24 to await bagging. Housing 20 may include a depression or bucket 36 at output end 24 for capturing the items.

A customer display 38 may be located at input end 22.

Transaction terminal 12 is located between input end 22 and output end 24. Transaction terminal 12 controls operation of checkout stand 10 and its components. Transaction terminal 12 includes one or more processors, memory, and program and data storage. Transaction terminal 12 may execute an operating system such as a Microsoft or other operating system. Transaction terminal 12 may execute transaction processing and other software that may be stored in a computer readable medium, such as a memory. Transaction terminal 12 may be coupled to other computers, including an in-store server, via a network.

Transaction terminal 12 further includes a display and an input device, which may be combined as a touch screen 60.

Transaction terminal 12 additionally includes components and peripherals necessary to accomplish its purpose, including graphics circuitry for connecting to the display, network circuitry for connecting to a network, peripheral connection circuitry for connecting to peripherals including item identifier 26, scale 28, and customer display 38, and for connecting to additional peripherals including one or more payment devices 62, a printer 64, an indicator 66, a security camera 68.

Payment device 62 may include one or more of a card reader for reading loyalty cards and payment cards, such as credit cards and debit cards, a currency dispenser and/or a currency acceptor, such as a currency recycler, and a coin dispenser and/or coin acceptor. An example payment device includes a payment terminal with a card reader, a keypad, and a display. Another example payment device includes a signature capture peripheral with a card reader.

Printer 64 prints a receipt for a transaction.

Indicator 66 may include on or more lights for signaling an attendant or security person. The lights may be mounted on a pole.

Security camera 68 allows a remote attendant or security person to monitor operator activity at checkout stand 10 and transaction terminal 12.

In an example self-service checkout mode of operation in which checkout stand 10 is located in a store where a customer is purchasing items, the customer positions a shopping cart 70 (FIG. 2) containing the items adjacent input end 22 for unloading. The customer first selects a begin transaction option via touch screen 60. Transaction terminal 12 operates conveyor 40.

The customer returns to input end 22 and places the items from cart 70 on conveyor section 42 at input end 22. Conveyor section 42 transports the items to the entrance of tunnel 52 and conveyor section 44. Conveyor section 44 transports the items to item identifier 26 where the items are identified. Item identifier 26 may be located between conveyor sections 44 and 46. The items pass to conveyor section 46 where the items are weighed by scale 28. Conveyor section 46 transports the items to conveyor section 48, which transports the items out of tunnel 52 and into bucket 36 to await bagging.

After the customer has placed all of the items on conveyor section 42, the customer moves cart 70 to transaction terminal 12, where the customer is able to view item identification and other information displayed by customer display 38. Transaction terminal 12 obtains the item identification information from item identifier 26 and obtains prices for the items, for example, from a price look-up file at an in-store server. Transaction terminal 12 displays the items and their prices on customer display 38.

When all of the items have exited tunnel 52, the customer selects a finish and pay option on touch screen 60. Transaction terminal 12 stops conveyor 40, tallies the items, and displays payment options. The customer selects one of the payment options and provides payment via payment device 62. Transaction terminal 12 processes the payment and causes printer 64 to print a receipt.

After the customer has paid for the items, the customer moves cart 70 to bagging station 30. The customer removes the items from bucket 36, bags the items, and places bags of items in cart 70. After the customer has removed all of the items from bucket 36 and loaded cart 70, the customer moves cart 70 away from checkout stand 10 and exits the store.

With reference to FIG. 3, another example embodiment of a checkout stand 10 is illustrated. Checkout stand 10 includes housing 90 which is again generally U-shaped and has adjacent input and output ends 92 and 94. Transaction terminal 12 is located between ends 92 and 94 an operates as described in the embodiment of FIGS. 1-2. Housing 90 differs from housing 20 of FIGS. 1-2 in that one of the corners has been replaced with a curved section. The curved section includes a curved conveyor section 104 and a curved tunnel cover 110.

Conveyor 100 also includes conveyor section 102 at input end 92 and convey section 106 at output end 94. Conveyor section 102 transports items from input end 92 to conveyor section 104 where they enter curved tunnel 112. Conveyor section 104 transports the items to conveyor section 106 where they exit curved tunnel 112.

As with the embodiment of FIGS. 1-2, this embodiment includes one or more item identifiers 26 and one or more scales 28 within curved tunnel 112. The embodiment further includes bucket 36 at output end 94, bagging station 30 at output end 94, indicator 66, camera 68, and customer display 38, which is mounted to curved tunnel cover 110, near the entrance to curved tunnel 112.

Advantageously, the generally square footprint occupied by checkout stand 10 and transaction terminal 12 offers retailers additional options for configuring a store. The checkout lane adjacent checkout stand 10 defining the path of cart 70 is linear, but since the distance between the input and output ends is shorter, a customer has improved control over items that are waiting to be bagged and placed in cart 70.

Although the present invention has been described with particular reference to certain preferred embodiments thereof, variations and modifications of the present invention can be effected within the spirit and scope of the following claims.

What is claimed is:

1. A checkout stand comprising:

a housing including a first end and a second end;

a bucket included as the second end;

a conveyor adapted and configured to transport items in a plurality of different directions along a non-linear path connecting the first end to the second end, wherein bucket is a depression in the housing and is configured to capture the items at the second end;

an item identifier within the housing on the non-linear path adapted and configured to automatically identify the items, wherein the checkout stand is a self-service checkout station associated with a checkout lane of retailer, wherein the item identifier includes a camera for capturing images of items;

a display situated at the first end;

a transaction terminal having a touch screen interface display situated in between the first end and the second end; and a security camera elevated above the housing from the transaction terminal.

2. The checkout stand of claim 1, wherein the housing is generally U-shaped.

3. The checkout stand of claim 1, wherein the conveyor comprises belts.

4. The checkout stand of claim 3, wherein the belts comprise a first belt for conveying items away from the first end, a second belt for conveying the items towards the second end, and a third belt for conveying the items from the first belt to the second belt.

5. The checkout stand of claim 4, wherein the third belt is linear.

6. The checkout stand of claim 4, wherein the third belt is curved.

7. The checkout stand of claim 1, further comprising a tunnel cover defining a tunnel over a portion of the housing.

8. The checkout stand of claim 7, wherein the tunnel comprises a first aperture and a second aperture.

9. The checkout stand of claim 8, wherein the tunnel is generally U-shaped and comprises a first aperture facing in a first direction towards the first end and a second aperture facing in a second direction towards the second end.

10. The checkout stand of claim 8, wherein the tunnel is curved and comprises a first aperture facing in a first direction towards the first end and a second aperture facing in a second direction perpendicular to a third towards the second end.

11. The checkout stand of claim 7, wherein the item identifier is within the tunnel.

12. The checkout stand of claim 7, wherein the housing comprises a scale for weighing items within the tunnel.

13. The checkout stand of claim 1, further comprising a bagging station at the second end.

14. A checkout stand comprising:

a housing including a first end facing perpendicular to a customer path and a second end facing perpendicular to the customer path;

a bucket included as the second end;

a conveyor including conveyor belts adapted and configured to transport items in a plurality of different directions along a non-linear path connecting the first end to the second end, including a first direction away from the first end and the customer path and a second direction towards the bucket is a depression in the housing of the second end and the customer path, and the bucket is configured for capturing the items in a bucket at the send end;

a tunnel cover defining a tunnel over a portion of the housing;

a display situated at the first end;

a transaction terminal situated in between the first end and the second end and the transaction terminal including a touch screen interface display; and a security camera elevated above the housing from the transaction terminal;

wherein the housing further comprises an item identifier adapted and configured to identify items within the tunnel and a scale adapted and configured to weigh the items within the tunnel, wherein the item identifier includes a camera for capturing images of the some of the items within the tunnel, and wherein the checkout stand is an assisted service checkout station associated with a retail checkout lane.

15. A computerized method of operating a checkout stand to process items during a transaction comprising:

operating, by the checkout stand associated with a retail checkout lane, a conveyor to transport items in a plurality of different directions along a non-linear path from a first end of a checkout stand housing where the items are placed by a customer to a second end of the checkout stand housing where the items are removed by the customer, wherein operating further includes collecting the items in a depression of the housing that forms a bucket at the second end of the housing where the items are removed by the customer after collection in the bucket at the second end, and wherein operating further includes interacting by the customer with a touch screen interface display of a transaction terminal situated in between the first and second ends; and receiving identification information associated with the items from an item identifier in the housing on the non-linear path.

16. The method of claim 15, further comprising:

receiving weight information associated with the items from a scale in the housing on the non-linear path.

17. The method of claim 15, wherein operating includes operating the conveyor to transport the items through a tunnel over a portion of the non-linear path.

18. The method of claim 15, wherein operating includes operating a first belt to transport the items away from the first end, operating a second belt to transport the items towards the second end, and operating a third belt to transport the items from the first belt to the second belt.

19. The method of claim 17, wherein the first end faces perpendicular to a customer path and the second end faces perpendicular to the customer path, and wherein operating includes operating the conveyor to transport the items in a first direction away from the first end and the customer path and in a second direction towards the second end and the customer path.

* * * * *